United States Patent [19]

Strub

[11] Patent Number: 4,520,916

[45] Date of Patent: Jun. 4, 1985

[54] CLUTCH DISC ASSEMBLY INCLUDING A FLANGE ON THE CLUTCH DISC, THE FLANGE EXTENDING THROUGH ONE GUIDE PLATE AND A FRICTION DISC

[75] Inventor: Jean-Claude Strub, Strassburg-Neuhof, France

[73] Assignee: Luk Lamellen und Kupplungsbau GmbH, Bühl, Fed. Rep. of Germany

[21] Appl. No.: 396,615

[22] Filed: Jul. 9, 1982

[30] Foreign Application Priority Data

Sep. 15, 1981 [DE] Fed. Rep. of Germany ....... 3136600

[51] Int. Cl.³ .......................... F16D 3/14; F16D 3/66
[52] U.S. Cl. ............................. 192/106.2; 192/70.17; 464/68
[58] Field of Search ................. 192/106.2, 70.17; 464/68, 66, 81

[56] References Cited

U.S. PATENT DOCUMENTS

| 3,817,362 | 6/1974 | Rist | 192/106.1 |
|---|---|---|---|
| 3,863,747 | 2/1975 | Werner et al. | 192/70.17 X |
| 3,931,876 | 1/1976 | Beeskow et al. | 192/106.1 X |
| 4,018,320 | 4/1977 | Schrape et al. | 464/68 X |
| 4,036,341 | 7/1977 | Beeskow et al. | 192/106.2 |
| 4,044,873 | 8/1977 | Parsons et al. | 192/106.2 |
| 4,044,874 | 8/1977 | Wörner | 192/106.2 |
| 4,122,931 | 10/1978 | Maucher | 192/106.2 |
| 4,212,380 | 7/1980 | Billes | 192/106.2 |
| 4,376,477 | 3/1983 | Loizeau | 192/106.2 |
| 4,378,869 | 4/1983 | Friedmann | 192/106.2 |
| 4,381,052 | 4/1983 | Maucher | 192/106.2 |
| 4,406,357 | 9/1983 | Nagano et al. | 192/106.2 |

FOREIGN PATENT DOCUMENTS

| 2907045 | 8/1979 | Fed. Rep. of Germany ... 192/106.2 |
|---|---|---|
| 130801 | 5/1978 | German Democratic Rep. . |
| 97542 | 7/1980 | Japan | 192/106.2 |
| 97543 | 7/1980 | Japan | 192/106.2 |
| 147926 | 11/1981 | Japan | 192/106.2 |
| 1200013 | 7/1970 | United Kingdom | 192/106.2 |
| 1196811 | 7/1970 | United Kingdom | 192/106.2 |
| 1602408 | 3/1978 | United Kingdom . |
| 2050565 | 1/1981 | United Kingdom . |
| 1592007 | 7/1981 | United Kingdom . |

Primary Examiner—Rodney H. Bonck
Assistant Examiner—David D. House
Attorney, Agent, or Firm—Peter K. Kontler

[57] ABSTRACT

A clutch disc assembly for use in friction clutches of automotive vehicles has a hub with two spaced-apart annular guides and a mounting flange between the guides. A clutch disc is rotatable relative to the hub from a neutral position and surrounds the flange. The initial stage or stages of rotation of the clutch disc relative to the hub are opposed by one or more friction pads which are interposed between the clutch disc and one of the guides and/or between the clutch disc and the flange. Further rotation of the clutch disc relative to the hub is opposed by a friction disc which is adjacent to the outer side of and is biased against the other guide with the interposition of one or more friction pads. The clutch disc has projections which extend in parallelism with the axis of the hub, first with smaller clearance through relatively wide cutouts of the other guide and thereupon with larger clearance through narrower cutouts of the friction disc so that the projections can entrain the friction disc while rotating relative to the hub and that joint rotation of the two discs is terminated when the projections strike against the other guide.

36 Claims, 3 Drawing Figures

CLUTCH DISC ASSEMBLY INCLUDING A FLANGE ON THE CLUTCH DISC, THE FLANGE EXTENDING THROUGH ONE GUIDE PLATE AND A FRICTION DISC

CROSS-REFERENCE TO RELATED CASES

Clutch disc assemblies which, in certain respects, are somewhat similar to the clutch disc assembly of the present invention are disclosed in commonly owned copending application Ser. No. 394,830 filed July 2, 1982 by Paul Maucher for "Clutch Disc Arrangement" and in my commonly owned copending application Ser. No. 396,137 filed July 7, 1982 for "Clutch Disc Arrangement".

BACKGROUND OF THE INVENTION

The present invention relates to clutches in general, and more particularly to improvements in clutch disc assemblies which can be utilized in friction clutches for automotive vehicles or the like.

It is already known to provide a clutch disc assembly with a first component having a rotary hub and two annular guides which are spaced apart from one another, which rotate with and which surround the hub, and with a second component which includes a clutch disc disposed between the two guides and carrying the customary friction coatings engageable with the pressure plates of a friction clutch. The clutch disc is rotatable within limits relative to the first component, and the assembly normally further comprises energy storing devices which are installed between the two components to yieldably resist at least the first or initial stage or stages of rotation of the clutch disc relative to the hub. For the sake of simplicity, reference will be had to rotation of the clutch disc relative to the hub with the understanding, however, that the hub can rotate relative to the clutch disc, that the clutch disc and the hub can simultaneously rotate in opposite directions or that the clutch disc and the hub can rotate in the same direction but at different speeds. It is also known to install between the clutch disc and the first component one or more friction generating devices which assist the energy storing devices in resisting rotation of the clutch disc with reference to the hub and/or which serve to oppose only certain advanced stages of rotation of the clutch disc relative to the hub, i.e., they become effective only after the clutch disc has already completed a certain angular movement from its initial or neutral position relative to the hub. The just discussed friction generating means can comprise a so-called load friction disc, one or more friction pads acting between the friction disc and a part of the first component, and preferably also one or more coil springs or other suitable energy storing devices interposed between the friction disc and a part of the first component.

A clutch disc assembly which embodies the afore-discussed structure is disclosed, for example, in East German Pat. No. 130,801. This patent describes an assembly wherein the space between the two guides of the first component accommodates discrete first and second friction generating devices (one for idling and the other for operation under load) which are disposed at the opposite sides of the clutch disc. A so-called load friction unit is mounted on the radially outermost portion of one of the guides, namely, on a guide which resembles a cup and carries a disc serving as a holder for the load friction unit. The timing of activation of the friction unit (namely, the extent of that angular movement of the clutch disc which is necessary to activate the friction unit) is determined by parts which resemble flags or lugs and are provided on the friction disc. The lugs extend through windows which are provided therefor in the clutch disc and cooperate with energy storing devices which oppose rotation of the clutch disc with reference to the hub. The just described clutch disc assembly is bulky, complex and expensive.

OBJECTS AND SUMMARY OF THE INVENTION

An object of the invention is to provide a clutch disc assembly which is simpler, more compact and less expensive than, but at least as versatile as, heretofore known clutch disc assemblies.

Another object of the invention is to provide a clutch disc assembly which can be used in existing friction clutches and like devices as a superior substitute for heretofore known clutch disc assemblies.

A further object of the invention is to provide a novel and improved method of assembling parts of a clutch disc assembly.

An additional object of the invention is to provide a clutch disc assembly whose space requirements, as considered in the axial direction, are less than those of conventional assemblies.

A further object of the invention is to provide a clutch disc assembly wherein certain stages of rotation of the clutch disc relative to the hub are regulated in a novel and improved way and wherein the extent of angular displacement of the clutch disc relative to the hub can be determined and selected in a simple and inexpensive manner.

Another object of the invention is to provide a novel and improved clutch disc and a novel and improved friction disc for use in a clutch disc assembly of the above outlined character.

An additional object of the invention is to provide a novel and improved first component (including the hub) which can be used in the above outlined clutch disc assembly as a more compact and more satisfactory substitute for the first components of heretofore known assemblies.

The improved clutch disc assembly is particularly suited for use in the clutches of automotive vehicles and comprises a first component including a hub and two spaced apart preferably washer-like annular guides surrounding the hub and being rotatable therewith, a second component including a clutch disc which is disposed between the two guides and is rotatable within limits relative to the first component, first energy storing means (e.g., one or more coil springs) interposed between the first and second components to yieldably resist at least some stages of rotation of the clutch disc relative to the first component from a predetermined neutral angular position, and means for yieldably opposing advanced stage of rotation of the clutch disc from its neutral position (i.e., for becoming effective after the clutch disc has already completed a certain angular movement from its neutral position). The rotation opposing means comprises at least one friction disc coaxial with the hub, friction generating means interposed between the friction disc and the first component, and second energy storing means (e.g., one or more additional coil springs) interposed between the friction disc and the first component. The clutch disc comprises means for regulating the operation of the friction generating means in cooperation with the friction disc and for terminating the angular displacement of the clutch disc relative to the first component.

The washer-like guides of the first component are preferably spaced apart from one another, as considered in the axial direction of the hub. The aforementioned friction generating means of the rotation opposing means can comprise at least one friction pad which is interposed between the friction disc and the first component. The second energy storing means can be interposed between the friction disc and one of the guides, and the regulating means can comprise means for engaging one of the guides in order to terminate the angular displacement of the clutch disc relative to the hub.

In accordance with a presently preferred embodiment of the invention, the regulating means can comprise at least one projection provided on the clutch disc and extending into a cutout in one of the guides. The friction disc can be provided with a cutout for such projection, and the projection is preferably at least substantially parallel to the axis of the hub.

The projection can be integral with the clutch disc or it may be separably machined and is thereupon welded, soldered or otherwise permanently or removably secured to the clutch disc. The projection or projections of the clutch disc are preferably disposed radially inwardly of the innermost portion or portions of the energy storing means, i.e., radially inwardly of the radially innermost portions of coil springs which may constitute the first and/or the second energy storing means. The clutch disc can be formed with windows for at least some of the energy storing means, and the projection or projections of the clutch disc can be disposed in the region or regions of such windows, i.e., adjacent to the windows. At least one of the guides can also be formed with one or more windows for certain springs of the energy storing means.

In accordance with a presently preferred embodiment of the improved clutch disc assembly, the friction disc has a discrete first cutout for each projection of the clutch disc and one of the guides has a discrete second cutout for each projection of the clutch disc. The width of each second cutout, as considered in the circumferential direction of the hub, preferably exceeds the width of the respective first cutout. The arrangement can be such that each first cutout receives the respective projection with a first clearance, and each second cutout receives the respective projection with a second clearance exceeding the first clearance, as considered in the circumferential direction of the hub. Consequently, the projections can engage and rotate the friction disc relative to the first component before the projections engage and are arrested by the one guide. In other words, the rotation opposing means can be said to be ineffective while the projections are free to move relative to the friction disc within the confines of the respective first cutouts.

It is presently preferred to install the friction disc and the friction generating means outside of the annular space between the two guides of the first component. In accordance with a presently preferred embodiment of the improved clutch disc assembly, each guide has an inner side which flanks the annular space surrounding the hub and an outer side; the friction disc and the friction generating means are adjacent to the outer side of one of the guides. (The rotation opposing means can further comprise a second friction disc and second friction generating means, both adjacent to the outer side of the other guide. Each friction disc can be held in frictional engagement with the respective guide. The second friction generating means can be interposed between the second friction disc and the respective guide. One of the friction generating means and the corresponding friction disc can be designed to oppose rotation of the clutch disc from the neutral position during a first stage of angular movement of the clutch disc relative to the hub, and the other friction generating means (together with the respective friction disc) can be designed to oppose rotation of the clutch disc from its neutral position during a second stage of angular movement of the clutch disc relative to the hub. Thus, the two friction generating means can operate independently of each other, but they can also be constructed and mounted to complement one another. For example, one of the friction generating means can be operative while the clutch disc rotates clockwise from its neutral position, and the other friction generating means can be operative while the clutch disc rotates counterclockwise from its neutral position.)

The first component can further comprise an annular mounting flange which is disposed between the two guides and may constitute an integral part of the hub, and the assembly can further comprise means for supporting the friction disc and rivets or other suitable fastener means for securing the guides and the supporting means to the flange. The radial dimensions of the flange are preferably small, e.g., the maximum diameter of the flange can constitute a small fraction of the maximum diameter of the second component and can be less or much less than the maximum diameter of the one and/or the other guide and/or the friction disc. The supporting means can comprise a marginal portion which maintains the friction disc in a predetermined position, as considered in the radial direction of the hub. The friction disc can constitute a washer whose radially innermost portion is surrounded and biased by the aforementioned marginal portion of the supporting means. The rotation opposing means can further comprise resilient means (e.g., a dished spring) which reacts against the supporting means and bears against the friction disc to urge the latter against one of the guides. As mentioned above, the friction generating means can also comprise at least one friction pad which is interposed between the friction disc and one of the guides.

The assembly can further comprise additional friction generating means which acts between the clutch disc and the first component. The clutch disc can have a central opening which receives the mounting flange of the hub; the additional friction generating means can comprise a member which is interposed between the flange and the clutch disc. The flange is disposed in the annular space between the guides, and the member of the additional friction generating means can include a first portion surrounding the peripheral surface of the flange and a second portion disposed between the clutch disc (radially outwardly of its central opening) and one of the guides, preferably that guide which cooperates with the friction disc of the rotation opposing means. The member of the additional friction generating means can have a substantially L-shaped cross-sectional outline and can constitute a split ring. Instead of or in addition to the just discussed split ring, the additional friction generating means can comprise at least one friction pad and means for biasing the friction pad (the biasing means can react against the clutch disc and cause the pad to bear against a part of the first component or vice versa).

The presently preferred distribution of various part of the improved clutch disc assembly is as follows: The clutch disc surrounds the flange of the hub between the guides, and one of the guides is disposed between the flange and the friction disc. The friction disc and the friction generating means of the rotation opposing means are outwardly adjacent to the one guide, the same as the supporting means for the friction disc and the friction generating means. If the assembly includes additional friction generating means, the latter is installed (at least in part) between the clutch disc and the other guide.

The novel features which are considered as characteristic of the invention are set forth in particular in the appended claims. The improved assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
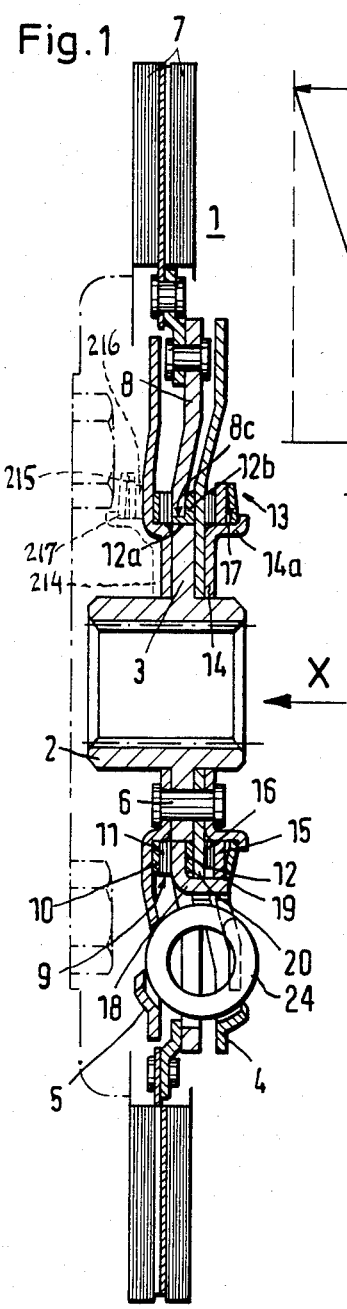
FIG. 1 is an axial sectional view of a clutch disc assembly which embodies the present invention.
Figure 2:
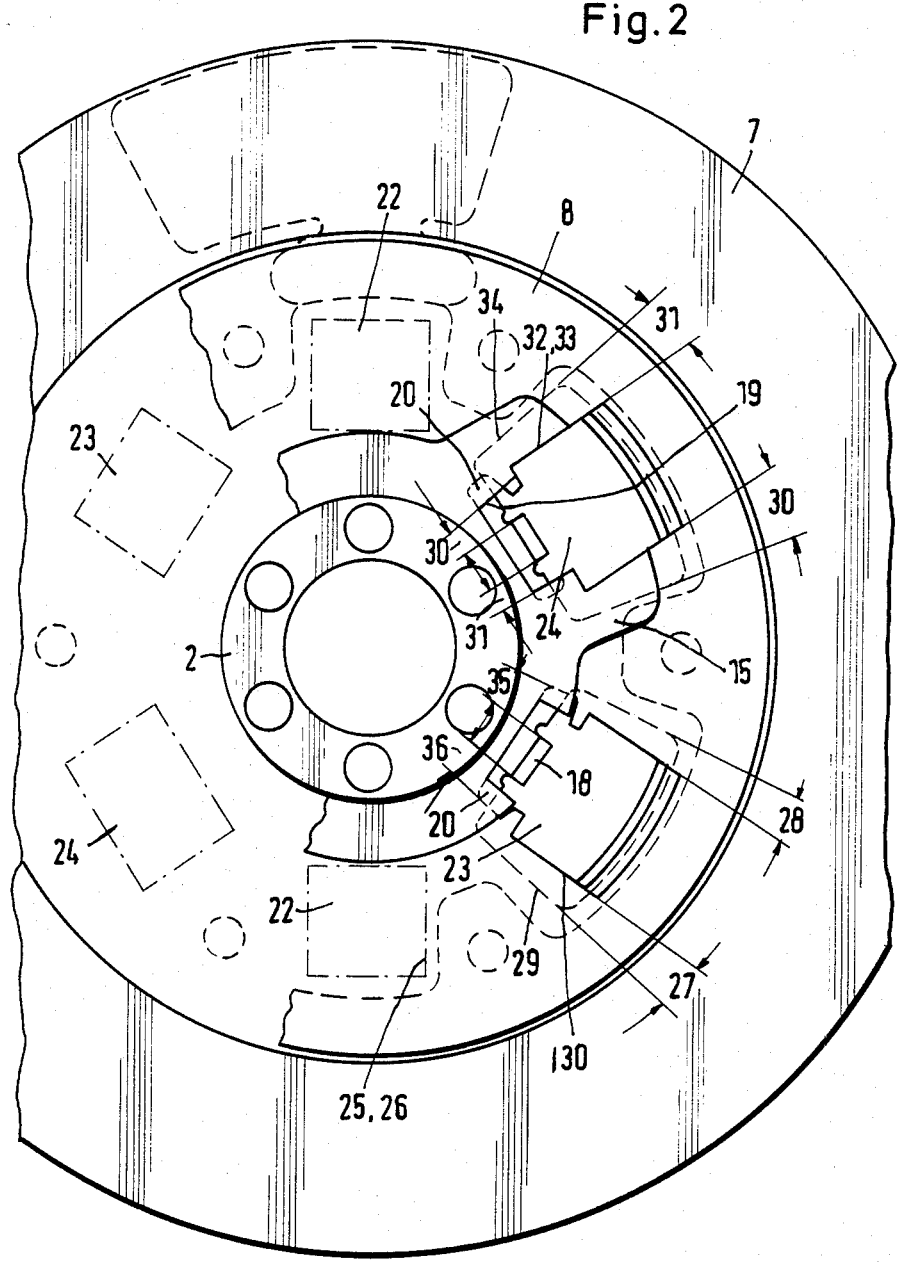
FIG. 2 is a fragmentary elevational view substantially as seen in the direction of arrow X in FIG. 1.

Referring to FIGS. 1 and 2, there is shown a friction clutch assembly 1 which includes a first component having a rotary hub 2, a radially outwardly extending mounting flange 3 which is integral with the hub 2, and two disc-shaped washer-like lateral guides 4 and 5 which are non-rotatably secured to the flange 3 by an annulus of rivets 6 or other suitable fasteners. A second component of the clutch disc assembly 1 comprises an annular clutch disc 8 which is rotatable within limits relative to the fist component to both sides of a predetermined neutral angular position, and two friction coatings 7 which are disposed at the opposite sides of and rotate with the clutch disc 8. For example, one of the coatings 7 can be engaged by the flywheel on a crankshaft forming part of an engine, and the other coating 7 can be engaged by a pressure plate forming part of a friction clutch which can couple the crankshaft to the input element of a change-speed transmission in an automotive vehicle. The maximum diameter of the mounting flange 3 is relatively small; it can be a fraction of the maximum diameters of the guides 4, 5 and can equal the inner diameter of the annular clutch disc 8. The radially innermost portion of the clutch disc 8 is disposed in the annular space between the guides 4, 5. The assembly 1 further comprises a first friction generating unit 9 which is disposed between the clutch disc 8 and the left-hand guide 5, as viewed in FIG. 1. The function of the unit 9 is to oppose each and every stage of rotation of the clutch disc 8 relative to the hub 2. As shown, the friction generating unit 9 comprises an energy storing device in the form of a dished spring 10, a first friction pad 11 at one side of the clutch disc 8, and a further friction pad in the form of a sleeve 12 at the other side of and within the clutch disc 8. The sleeve 12 has a substantially L-shaped cross-sectional outline. Reference may be had to my commonly owned copending application Ser. No. 396,137 filed July 7, 1982 for "Clutch Disc Arrangement" which fully discloses and shows a sleeve-like friction pad capable of being inserted into the central opening of an annular clutch disc so as to surround a first part of the first component and to be adjacent to and bear against a second part of the first component.

The clutch disc 8 has a central opening 8c which receives one portion 12a of the friction pad or sleeve 12. The portion 12a is a short cylinder which extends circumferentially of the hub 2. A second portion 12b of the friction pad or sleeve 12 extends radially of the hub 2 and resembles a flat washer which is interposed between the clutch disc 8 and the guide 4. As disclosed in my aforementioned copending application Ser. No. 396,137, the sleeve-like friction pad 12 can comprise a part which is made of steel and a part with a relatively high co-efficient of friction and constituting a coating or liner for the part which is made of steel. The friction pad 12 is a split ring so that it can be readily inserted into and withdrawn from the opening 8c of the clutch disc 8. The liner or coating of the friction pad 12 is adjacent to the peripheral surface of the flange 3 and to the left-hand side of the guide 4, as viewed in FIG. 1.

The assembly 1 further comprises a so-called load friction unit 13 which is disposed outside of the annular space between the guides 4, 5 of the first component and is adjacent to the outer side of the guide 4. The means for supporting the friction unit 13 comprises a guide ring or supporting ring 14 which is rigidly secured to the flange 3 of the hub 2 by the aforementioned fasteners 6. The friction unit 13 comprises a winged load friction disc 15 which is inwardly adjacent to an axially offset outer marginal portion 14a of the supporting ring 14 so that the ring 14 fixes the position of the friction disc 15, as considered in the radial direction of the first component including the hub 2. The friction unit 13 further comprises a friction generating device having a friction pad 16 which is interposed between the friction disc 15 and the guide 4, and a resilient energy storing device 17 in the form of a dished spring whose radially innermost portion reacts against the marginal portion 14a of the supporting ring 14 and whose radially outermost portion bears against the adjacent portion of the friction disc 15. In other words, the dished spring 17 urges the friction disc 15 and the friction pad 16 against the outer side of the guide 4 so that the pad 16 offers a certain resistance to rotation of the friction disc 15 relative to the guide 4.

In order to regulate the operation of the friction unit 13 via friction disc 15, the clutch disc 8 comprises projections in the form of arms 18 extending in parallelism with the axis of the hub 2 and with clearance into cutouts or slots 19 of the friction disc 15. The projections 18 can constitute integral parts of the clutch disc 8, i.e., they may constitute lugs which are bent out of the general plane of the clutch disc so as to extend toward the friction disc 15 and into the respective cutouts 19. While extending from the clutch disc 8 into the respective cutouts 19 of the friction disc 15, the projections 18 further extend with clearance through cutouts or slots 20 of the guide 4.

The assembly 1 further comprises a set of energy storing coil springs (one shown at 24 in FIG. 1) which spacedly surround the hub 2. The projections 18 of the clutch disc 8 are disposed radially inwardly of the annulus which is formed by such coil springs. These coil springs are installed in openings or windows (to be described hereinafter) which are machined into or otherwise formed in certain parts of the assembly 1, and the projections 18 are preferably located in the region of the innermost portions of such windows and radially inwardly of the radially innermost portions of the coil springs.

The width of the cutouts 20 in the guide 4, as considered in the circumferential direction of the hub 2, exceeds the width of the corresponding cutouts 19 in the friction disc 15. Thus, when the clutch disc 8 rotates relative to the hub 2, its projections 18 engage first the surfaces bounding the respective cutouts 19 before such projections engage the surfaces surrounding the respective cutouts 20. Rotation of the second component including the clutch disc 8 and its coatings 7 relative to the first component (including the parts 2, 3, 4 and 5) is terminated when the projections 18 engage the surfaces surrounding the respective cutouts 20, i.e., when the guide 4 is compelled to share angular movements of the disc 8 and the rivets 6 compel the hub 2, the flange 3 and the guide 5 to rotate with the guide 4.

Figure 3:
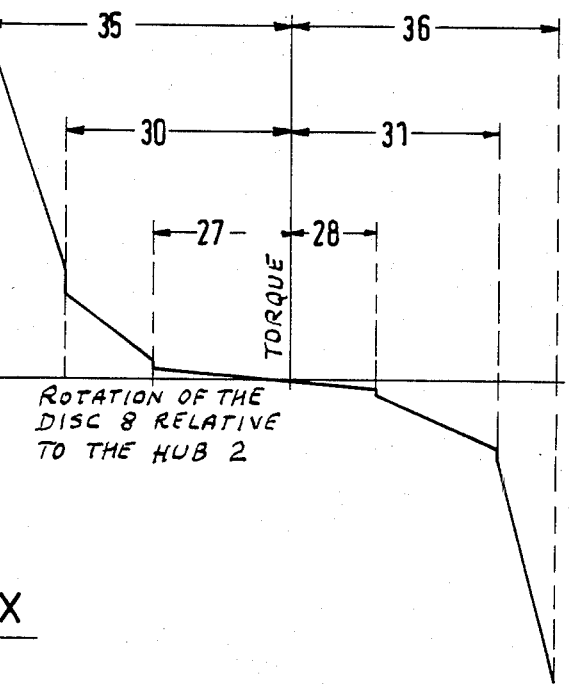
FIG. 3 is a diagram showing the relationship between torque and angular displacement of the clutch disc relative to the hub of the clutch disc assembly.

The operation of the clutch disc assembly 1 is as follows:

The path for transmission of torque between the hub 2 (i.e., the first component) and the second component including the clutch disc 8 and its coatings 7 comprises three groups or sets of energy storing cell springs 22, 23 and 24 (shown schematically in FIG. 2). The first group or set including the coil springs 22 is installed in windows 25 of the clutch disc 8 and in windows 26 of the guides 4 and 5. The dimensions of the windows 25 match those of the windows 26. The springs 22 act to oppose rotation of the clutch disc 8 from a neutral angular position through angles 27 and 28. The magnitude of torque which is necessary to overcome the resistance of the coil springs 22, while the clutch disc 8 rotates relative to the hub 2 through the angle 27 or 28, can be seen in the diagram of FIG. 3.

Once the clutch disc 8 has turned through an angle exceeding that shown at 27 or 28, the surfaces surrounding the windows 29 of the clutch disc 8 engage the coil springs 23 of the second set or group. The coil springs 23 are further installed in the windows 130 of the guides 4 and 5. The coil springs 23 are stressed and store energy (i.e., they oppose rotation of the clutch disc 8 relative to the hub 2) while the clutch disc 8 turns through the angle 30 minus 27 or through the angle 31 minus 28. At such time, rotation of the clutch disc 8 relative to the hub 2 is still opposed by the first friction generating unit 9 because the latter is effective during each and every stage of rotation of the clutch disc 8 from its neutral position through the angle 30 or 31.

The springs 24 of the third set or group are installed in the windows 32 of guides 4, 5 and in the windows 33 of the friction disc 15. The dimensions of the windows 33 (as considered in the circumferential direction of the hub 2) match those of the windows 32 in the guides 4 and 5. The springs 24 further extend into windows 34 which are provided therefor in the clutch disc 8 and whose width, as considered in the circumferential direction of the hub 2, exceeds the width of the windows 32 or 33 by a distance corresponding to the combined difference between the angles 27, 28 on the one hand and the angles 30, 31 on the other hand. This can be seen in FIG. 2. The projections 18 of the clutch disc 8 engage the surfaces surrounding the respective cutouts 19 when the angular displacement of the clutch disc 8 relative to the hub 2 exceeds the angle 30 or 31. From there on, and assuming that the extent of angular displacement of the clutch disc 8 from its neutral position continues to increase, the friction disc 15 rotates with the clutch disc 8 relative to the hub 2. At such time, the surfaces surrounding the windows 34 in the clutch disc 8 engage the corresponding coil springs 24 of the third set so that the springs 24 undergo compression and store energy with the result that they also oppose rotation of the clutch disc 8 relative to the hub 2. This also applies for the friction unit 13 which is active as soon as the friction disc 15 begins to rotate with the clutch disc 8.

When the angular displacement of the clutch disc 8 relative to the hub 2 reaches the value 35 or 36 (see FIG. 3), the projections 18 of the clutch disc 8 engage the surfaces bounding the cutouts 20 of the guide 4 and the clutch disc 8 is brought to a halt (as concerns is angular movement relative to the first component including the hub 2). From there on, the hub 2 shares all angular movements of the clutch disc 8 or vice versa. The friction generating unit 9 is effective within the entire range of angular movement of the clutch disc 8 relative to the hub 2 (i.e., through the sum of angles 35 and 36).

It is clear that the improved assembly is susceptible of many further modifications without departing from the sprit of the invention. For example, the assembly can comprise one or more projections 18 which are provided on the clutch disc 8 and engage the friction disc 15 after the clutch disc 8 completes an angular movement through the aforediscussed angle 30 or 31, and one or more discrete or additional projections or arms which engage the guide 4 or another part of the first component to terminate the angular movement of the clutch disc 8 with reference to the hub 2.

An important advantage of the improved clutch disc assembly is its simplicity. This is attributable, in part, to the feature that the projections 18 of the clutch disc 8 can strike directly against one of the guides 4, 5 when the angular movement of the clutch disc relative to the first component is to be terminated. This obviates the need for bolts or otherwise configurated stops between the guides 4 and 5 for the clutch disc 8. Moreover, the provision of projections 18 on the clutch disc 8 renders it possible to employ a very simple and inexpensive friction disc, i.e., the disc 15 need not be formed with lugs and/or other types of protuberances in order to participate in regulation of operation of the friction generating device including the parts 16 and 17.

As explained above, the friction unit 13 need not be active or operative during the initial stage or stages of rotation of the clutch disc 8 from its neutral angular position relative to the first component including the parts 2 to 5. The unit 13 begins to participate in the opposition to rotation of the clutch disc 8 relative to the hub 2 when the projections 18 engage the surfaces bounding the respective cutouts 19 of the friction disc 15, i.e., when the discs 8 and 15 rotate in unison with reference to the first component. If desired, the projections 18 can be provided close to the radially outermost part of the clutch disc 8 or close to the radially outermost portion of the guide 4. The previously discussed positioning of the projections 18 is preferred at this time, i.e., inwardly of the radially innermost portions of the coil springs 22, 23 and 24 and in the region of windows (such as 25, 26 and 34) in the clutch disc 8. This contributes to compactness of the clutch disc assembly, as considered in the radial direction of the hub 2.

It is further possible to provide two load friction units, one at the outer side of each of the two guides 4 and 5. FIG. 1 shows by broken lines a portion of a second load friction unit, namely, a portion of a second friction disc 215, a portion of a friction pad 216 and a portion of an energy storing resilient device 217 which reacts against a supporting member 214 and urges the parts 215 and 216 against the outer side of the guide 5. It will be noted that both load friction units are disposed outside of the annular space between the guides 4 and 5. The two load friction units can operate in parallelism with one another, or each thereof can be entirely independent of the other, i.e., the unit 13 can be operative to oppose one or more first stages of angular movement of the clutch disc 8 relative to the hub 2, and the unit including the parts 215 to 217 can be operative to resist or oppose one or more second stages of angular movement of the clutch disc with reference to the first component.

The friction pad 16 or 216 can be omitted, i.e., the respective friction unit can rely exclusively on friction between the disc 15 or 215 and the corresponding guide (4 or 5). It has been found that, by properly selecting the friction coefficient and the dimensions of the pad 16 or 216, the opposition of the corresponding friction unit can be enhanced at a minimal additional cost.

The aforementioned parts 10 and 11 of the friction generating device 9 can be said to constitute a so-called damping device which is active during idling, namely, when the clutch disc 8 is still free to rotate relative to the friction disc 15 and/or 215. Such damping device is desirable and advantageous in many types of clutch disc assemblies. As shown, the parts 10 and 11 are disposed at that side of the clutch disc 8 which faces away from the portion 12b of the member 12, i.e., which faces away from the guide 4 and toward the inner side of the guide 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch disc assembly, particularly for use in in the clutches of automotive vehicles, comprising a first component including a hub and two spaced apart guides rotatable with the hub; a second component including a clutch disc disposed between said guides and rotatable within limits relative to said first component; first energy storing means interposed between said components to yieldably resist at least some stages of rotation of said clutch disc relative to said first component from a neutral position; and means for yieldably opposing advanced stages of rotation of said clutch disc from said neutral position, comprising at least one friction disc, friction generating means acting between said friction disc and said first component, and second energy storing means interposed between said friction disc and said first component, said clutch disc comprising means for regulating the operation of said friction generating means in cooperation with said friction disc and for limiting the extent of angular displacement of said clutch disc relative to said first component, said regulating means comprising at least one projection provided on said clutch disc, one of said guides and said friction disc having a cutout for said projection.

2. The assembly of claim 1, further comprising additional friction generating means acting between said clutch disc and said first component.

3. The assembly of claim 2, wherein said hub comprises a radially outwardly extending mounting flange and said clutch disc has a central opening receiving said flange, said additional friction generating means including a member interposed between said flange and said clutch disc.

4. The assembly of claim 3, wherein said flange is disposed between said guides and said member of said additional friction generating means includes a first portion surrounding said flange and a second portion disposed between said clutch disc and one of said guides.

5. The assembly of claim 4, wherein said member of said additional friction generating means has a substantially L-shaped cross-sectional outline and constitutes a split ring.

6. The assembly of claim 4, wherein said friction disc is in frictional engagement with said one guide.

7. The assembly of claim 1, wherein said guides define an annular space surrounding said hub, said friction disc and said friction generating means being disposed outside of said space.

8. The assembly of claim 7, wherein each of said guides has an inner side flanking said space and an outer side, said friction disc and said friction generating means being adjacent to the outer side of one of said guides.

9. The assembly of claim 8, wherein said rotation opposing means further comprises a second friction disc and second friction generating means, said second friction disc and said second friction generating means being adjacent to the outer side of the other of said guides.

10. The assembly of claim 1, wherein said friction disc is in frictional engagement with one of said guides.

11. The assembly of claim 10, wherein said rotation opposing means further comprises a second friction disc in frictional engagement with the other of said guides and second friction generating means acting between said second friction disc and said first component.

12. The assembly of claim 11, wherein one of said friction generating means is operative to oppose rotation of said clutch disc from neutral position during a first stage of angular movement of said clutch disc relative to said hub and said second friction generating means is operative to oppose rotation of said clutch disc from said neutral position during a second stage of angular movement of said clutch disc relative to said hub independently of said first friction generating means.

13. The assembly of claim 1, wherein said hub comprises a radially outwardly extending flange between said guides, said clutch disc surrounding said flange between said guides, and one of said guides being disposed between said flange and said friction disc.

14. The assembly of claim 13, wherein said one guide has an inner side facing said flange and an outer side adjacent said friction disc, said friction generating means being adjacent to the outer side of said other guide and further comprising supporting means for said friction disc and said friction generating means, said supporting means being adjacent to the outer side of said one guide and being secured to said hub.

15. The assembly of claim 14, further comprising additional friction generating means acting between said clutch disc and said first component, said additional friction generating means being disposed between said clutch disc and the other of said guides.

16. The assembly of claim 1, wherein said first component further comprises an annular mounting flange disposed between said guides, means for supporting said friction disc, and fastener means for securing said guides and said supporting means to said flange.

17. The assembly of claim 16, wherein said flange is integral with said hub and said fastener means comprises rivets.

18. The assembly of claim 16, wherein the maximum diameter of said flange is a small fraction of the maximum diameter of said second component and is less than the maximum diameters of said guides and said friction disc.

19. The assembly of claim 1, further comprising supporting means rotatable with said first component and including a portion which maintains said friction disc in a predetermined position, as considered radially of said hub.

20. The assembly of claim 19, wherein said friction disc is a washer having a radially innermost portion surrounded by said portion of said supporting means.

21. The assembly of claim 19, wherein said friction disc is adjacent to one of said guides and said rotation opposing means further comprises resilient means reacting against said supporting means and bearing against said friction disc to urge the latter against said one guide.

22. The assembly of claim 1, wherein said energy storing means comprise at least one spring and said clutch disc has a window for said spring, said projection being adjacent to said window.

23. The assembly of claim 22, wherein at least one of said guides has a second window receiving a portion of said spring.

24. The assembly of claim 1, wherein said guides include washers which are spaced apart from one another, as considered in the axial direction of said hub.

25. The assembly of claim 1, wherein said friction generating means comprises at least one friction pad which is interposed between said friction disc and said first component.

26. The assembly of claim 1, wherein said second energy storing means is interposed between said friction disc and at least one of said guides.

27. The assembly of claim 1, wherein said projection is arranged to engage said one guide in order to terminate the angular displacement of said clutch disc relative to said hub.

28. The assembly of claim 1, wherein said projection is at least substantially parallel with the axis of said hub.

29. The assembly of claim 1, wherein said one projection is integral with said clutch disc and extends in substantial parallelism with the axis of said hub.

30. The assembly of claim 1, wherein said energy storing means comprise at least one spring disposed radially outwardly of said hub and said projection extends from said clutch disc in substantial parallelism with the axis of said hub radially inwardly of said spring.

31. The assembly of claim 1, wherein said friction generating means comprises at least one friction pad interposed between said friction disc and one of said guides.

32. The assembly of claim 1, further comprising additional friction generating means acting between said clutch disc and one of said guides, said additional friction generating means comprising at least one friction pad and means for biasing said pad.

33. A clutch disc assembly, particularly for use in the clutches of automotive vehicles, comprising a first component including a hub and two spaced apart guides rotatable with the hub; a second component including a clutch disc disposed between said guides and rotatable within limits relative to said first component; first energy storing means interposed between said components to yieldably resist at least some stages of rotation of said clutch disc relative to said first component from a neutral angular position; and means for yieldably opposing advanced stages of rotation of said clutch disc from said neutral position, comprising at least one friction disc, friction generating means acting between said friction disc and said first component, and second energy storing means interposed between said friction disc and said first component, said clutch disc comprising means for regulating the operation of said friction generating means in cooperation with said friction disc and for limiting the extent of angular displacement of said clutch disc relative to said first component, said regulating means comprising at least one projection provided on said clutch disc, said friction disc having a first cutout receiving said projection with a first clearance, as considered in the circumferential direction of said hub, and one of said guides having a second cutout receiving said projection with a larger second clearance so that said projection can engage and rotate said friction disc relative to said first component before it engages and is arrested by said one guide.

34. The assembly of claim 33, wherein said rotation opposing means is ineffective while said projection is free to move relative to said friction disc within the confines of said first cutout.

35. A clutch disc assembly, particularly for use in the clutches of automotive vehicles, comprising a first component including a hub and two spaced apart guides rotatable with the hub; a second component including a clutch disc disposed between said guides and rotatable within limits relative to said first component; first energy storing means interposed between said components to yieldably resist at least some stages of rotation of said clutch disc relative to said first component from a neutral angular position; and means for yieldably opposing advanced stages of rotation of said clutch disc from said neutral position, comprising at least one friction disc, friction generating means acting between said friction disc and said first component, and second energy storing means interposed between said friction disc and said first component, said clutch disc comprising means for regulating the operation of said friction generating means in cooperation with said friction disc and for limiting the extent of angular displacement of said clutch disc relative to said first component, said regulating means comprising at least one projection provided on said clutch disc and extending in substantial parallelism with the axis of said hub, said friction disc and one of said guides respectively having first and second cutouts for said projection.

36. A clutch disc assembly, particularly for use in the clutches of automotive vehicles, comprising a first component including a hub and two spaced apart guides rotatable with the hub; a second component including a clutch disc disposed between said guides and rotatable within limits relative to said first component; first energy storing means interposed between said components to yieldably resist at least some stages of rotation of said clutch disc relative to said first component from a neutral angular position; and means for yieldably opposing advanced stages of rotation of said clutch disc from said neutral position, comprising at least one friction disc, friction generating means acting between said friction disc and said first component, and second energy storing means interposed between said friction disc and said first component, said clutch disc comprising means for regulating the operation of said friction generating means in cooperation with said friction disc and for limiting the extent of angular displacement of said clutch disc relative to said first component, said regulating means comprising a projection provided on said clutch disc, said friction disc having a first cutout for said projection and one of said guides having a second cutout for said projection, the width of said second cutout, as considered in the circumferential direction of said hub, exceeding the width of said first cutout.

* * * * *